(12) United States Patent
Jo (10) Patent No.: US 11,724,580 B2
(45) Date of Patent: Aug. 15, 2023

(54) ROOF DEVICE FOR VEHICLE AND CONTROL METHOD THEREOF

(71) Applicants: Hyundai Motor Company, Seoul (KR); Kia Corporation, Seoul (KR)

(72) Inventor: Ho Ssang Jo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/688,033

(22) Filed: Mar. 7, 2022

(65) Prior Publication Data
US 2023/0143644 A1    May 11, 2023

(30) Foreign Application Priority Data
Nov. 5, 2021  (KR) .................. 10-2021-0151799

(51) Int. Cl.
*B60J 7/12*  (2006.01)
*B60J 7/057*  (2006.01)
*B60J 7/053*  (2006.01)
*B60J 7/043*  (2006.01)
*B60J 7/047*  (2006.01)
*B60J 7/02*  (2006.01)

(52) U.S. Cl.
CPC ............. *B60J 7/1204* (2013.01); *B60J 7/057* (2013.01); *B60J 7/028* (2013.01); *B60J 7/043* (2013.01); *B60J 7/047* (2013.01); *B60J 7/0435* (2013.01); *B60J 7/053* (2013.01)

(58) Field of Classification Search
CPC ............. B60J 7/1204; B60J 7/057; B60J 7/19; B60J 7/022; B60J 7/041; B60J 7/003; B60J 7/0038; B60J 7/043; B60J 7/0435; B60J 7/047; B60J 7/05; B60J 7/053; B60J 7/0573; B60J 7/028; B60J 7/02; B60J 1/1838; B60J 1/1846; B60J 1/1853; B60J 1/1876; B60J 1/1884; B60J 1/04; B60J 1/06; B60J 1/043
USPC ............. 296/100.05, 100.06, 187.01, 216.01, 296/216.02, 216.03, 216.04, 222, 223
See application file for complete search history.

(56) References Cited

U.S. PATENT DOCUMENTS 7,506,915 B2 * 3/2009 Bunsmann .............. B60J 7/04
                                                     296/107.08
9,248,725 B2 * 2/2016 Comfort .................. B60J 7/04
(Continued)

FOREIGN PATENT DOCUMENTS

CN    212654194 U  *  3/2021  ............ B60J 11/08
KR    101459214 B1 *  11/2014 ............ B60T 1/16
KR    102398112 B1 *  5/2022  ............ B60J 5/0494

OTHER PUBLICATIONS

Yang, "Vehicle windshield protection device", Publication Date: Mar. 5, 2021, Publisher: Chinese Patent Office, Edition: CN212654194U (Year: 2021).*

(Continued)

*Primary Examiner* — Dennis H Pedder
*Assistant Examiner* — Joyce Eileen Hill
(74) *Attorney, Agent, or Firm* — Fox Rothschild LLP (57) ABSTRACT

A roof device for a vehicle includes: a plurality of plate members and a frame coupled to a vehicle body and configured to support the plurality of plate member, where at least a portion of the frame is configured to rotate around its edge, and at least one of the plurality of plate members is configured to slide along an inner edge of the frame.

17 Claims, 10 Drawing Sheets

(56) References Cited

U.S. PATENT DOCUMENTS

| 10,239,390 | B1* | 3/2019 | Wolf | B60J 7/02 |
| 10,960,744 | B1* | 3/2021 | Earl | B60J 7/1642 |
| 2001/0030452 | A1* | 10/2001 | Karami | B60J 7/047 |
| | | | | 296/220.01 |

OTHER PUBLICATIONS

Kwan, "Air Brake Apparatus for Cruise Control of Vehicle", Publication Date: Nov. 7, 2014, Publisher: Korean Patent Office, Edition: KR101459214B1 (Year: 2014).*

Hak, "Rain Blocking Device for Motors", Publication Date: May 13, 2022, Publisher: Korean Patent Office, Edition: KR10239811B1 (Year: 2022).*

* cited by examiner

ROOF DEVICE FOR VEHICLE AND CONTROL METHOD THEREOF

CROSS-REFERENCE TO RELATED APPLICATION

This application claims under 35 U.S.C. § 119(a) the benefit of Korean Patent Application No. 10-2021-0151799, filed on Nov. 5, 2021, the entire contents of which are incorporated herein by reference.

BACKGROUND

(a) Technical Field

The present disclosure relates to a roof device for a vehicle and a control method thereof, more particularly, to the roof device that may be opened and closed in a sliding manner or in a hinged manner.

(b) Description of the Related Art

The contents described in this section merely provide background information for the present disclosure and do not constitute the prior art.

As autonomous driving technology of vehicles has developed, the understanding of a vehicle has expanded from simply a mode of transportation to now encompassing a living space. In particular, the arrangement of an indoor space in a vehicle is becoming a factor that contributes to vehicle competitiveness. An indoor space of a vehicle is partitioned from the outside by a vehicle body, a windshield, a window, a roof, and the like. Since a conventional vehicle has an indoor space fixedly determined by a vehicle body or the like, it is not possible to change the indoor space in response to an occupant's lifestyle.

SUMMARY

In view of the above, the present disclosure provides a roof device for a vehicle configured to be opened and closed in a sliding manner or in a hinged manner to change an indoor space of the vehicle, e.g., to correspond to a lifestyle of an occupant.

In addition, the control method of the roof device according to an embodiment of the present disclosure has an effect of improving fuel efficiency of the vehicle by adjusting the degree of opening of the roof device based on a speed of the vehicle.

The problems to be solved by the present disclosure are not limited to the problems mentioned above, and other problems not mentioned will be clearly understood by those skilled in the art from the following description.

As described above, the roof device according to an embodiment of the present disclosure is configured to be opened and closed in a sliding manner or in a hinged manner, so that an indoor space of the vehicle may be changed to correspond to a lifestyle of an occupant.

A roof device for a vehicle may include: a plurality of plate members; and a frame coupled to a vehicle body and configured to support the plurality of plate member, where at least a portion of the frame is configured to rotate around its edge, and at least one of the plurality of plate members is configured to slide along an inner edge of the frame.

In addition, the control method of the roof device according to an embodiment of the present disclosure has an effect of improving fuel efficiency of the vehicle by adjusting the degree of opening of the roof device based on a speed of the vehicle.

A control method of a roof device for a vehicle may include a control unit for controlling a first motor configured to supply power to a power transmission mechanism such that at least one of a plurality of plate members slides on supporting members, and control a second motor configured to supply its power to at least one of the supporting members to rotate the at least one of the supporting members around its edge, where the control method includes steps of: receiving, by the control unit, a speed of the vehicle from a wheel speed sensor; determining, by the control unit, whether the vehicle is driving; and controlling, by the control unit, a rotation amount of each of the first motor and the second motor, so that a change in the rotation amount of the first motor with respect to a change in the speed of the vehicle, and a change in the rotation amount of the second motor with respect to a change in the speed of the vehicle have a value less than or equal to 0, when it is determined that the vehicle is driving.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof. Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
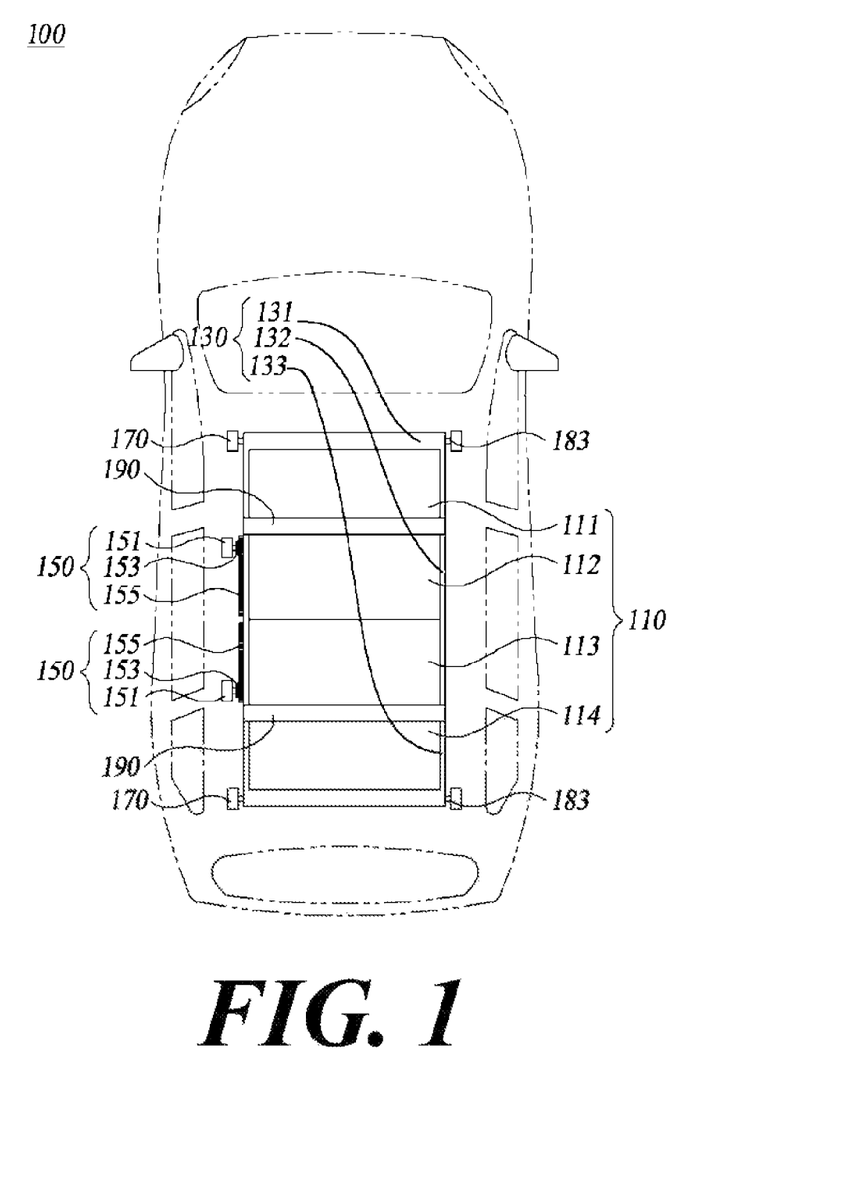
FIG. 1 is a top view illustrating a roof device for a vehicle according to an embodiment of the present disclosure.

FIG. 1 is a top view illustrating a roof device for a vehicle according to an embodiment of the present disclosure.

Referring to FIG. 1, a roof device 100 for a vehicle according to an embodiment of the present disclosure includes all or some of plate members 111 to 114, a frame 130, a power transmission mechanism 150, a second motor 170, and a sealing member 190.

A window for mounting the frame 130 is perforated on a roof of the vehicle. In the present disclosure, a state in which the roof device 100 covers the window to partition the outside of the roof and the interior of the vehicle is referred to as a closed state of the roof device 100. A state in which the roof device 100 partially covers the window or does not cover the window is referred to as an open state of the roof device 100. The frame 130 is mounted on the periphery of the window, and a plurality of plate members 111 to 114 are mounted on an inner edge of the frame 130. At least one of the plurality of plate members 111 to 114 are mounted to be slidable on the inner edge of the frame 130. An occupant of the vehicle may adjust a position of the frame 130 or the plate members 111 to 114 so that the plurality of plate members 111 to 114 completely cover the roof of the vehicle. Here, the occupant adjusting the position may include a case in which a driving signal for driving a motor configured for the occupant to adjust the position of supporting members 131 to 133 or the plate members 111 to 114 is generated. In order to prevent the roof device 100 from being unintentionally opened or closed by an external force, the supporting members 131 to 133 or the plate members 111 to 114 may be configured to be slidable only by a driving signal.

The roof device 100 according to an embodiment of the present disclosure may include four plate members. In the present disclosure, the four plate members 111 to 114 include a first plate member 111, a second plate member 112, a third plate member 113, and a fourth plate member 114. However, the roof device 100 of the present disclosure is not limited to having four plate members 111 to 114. For example, the roof device 100 may include two plate members. The roof device 100 may adjust positions of the first to fourth plate members 111 to 114 by allowing the first to fourth plate members 111 to 114 to slide on the inner edge of the frame 130. The first to fourth plate members 111 to 114 may be configured to completely cover the window of the roof in a state in which the first to fourth plate members 111 to 114 are sequentially arranged. The first to fourth plate members 111 to 114 may each be formed to have a rectangular shape. The first to fourth plate members 111 to 114 may be formed of a material allowing light to be transmitted therethrough. For example, the first to fourth plate members 111 to 114 may be formed of tempered glass. Outer or inner surfaces of the first to fourth plate members 111 to 114 may be coated with ultraviolet (UV) blocking paint.

In the present disclosure, the front, rear, left, and right sides of the vehicle refer to a front side of the vehicle, a rear side of the vehicle, a left side of the vehicle, and a right side of the vehicle, respectively. In the present disclosure, a direction in which the front and rear of the vehicle are connected is referred to as a longitudinal direction, and a direction in which the left and right sides of the vehicle are connected is referred to as a transverse direction. A transverse length of the first to fourth plate members 111 to 114 may be formed to correspond to a transverse length of a hollow (hereinafter, 'hollow of the frame') bordering the inner edge of the frame 130. The sum of the lengths of the first to fourth plate members 111 to 114 in the longitudinal direction may correspond to a longitudinal length of the hollow so that the interior of the vehicle is partitioned from an external space in a state in which the first to fourth plate members 111 to 114 are sequentially arranged in the longitudinal direction. In the drawings of the present disclosure, it is illustrated that the first to fourth plate members 111 to 114 have the same shape and are arranged in the longitudinal direction. However, the roof device 100 of the present disclosure is not limited thereto. For example, the first to fourth plate members 111 to 114 may have different shapes, or the first to fourth plate members 111 to 114 may be sequentially arranged in a transverse direction.

Figure 2:
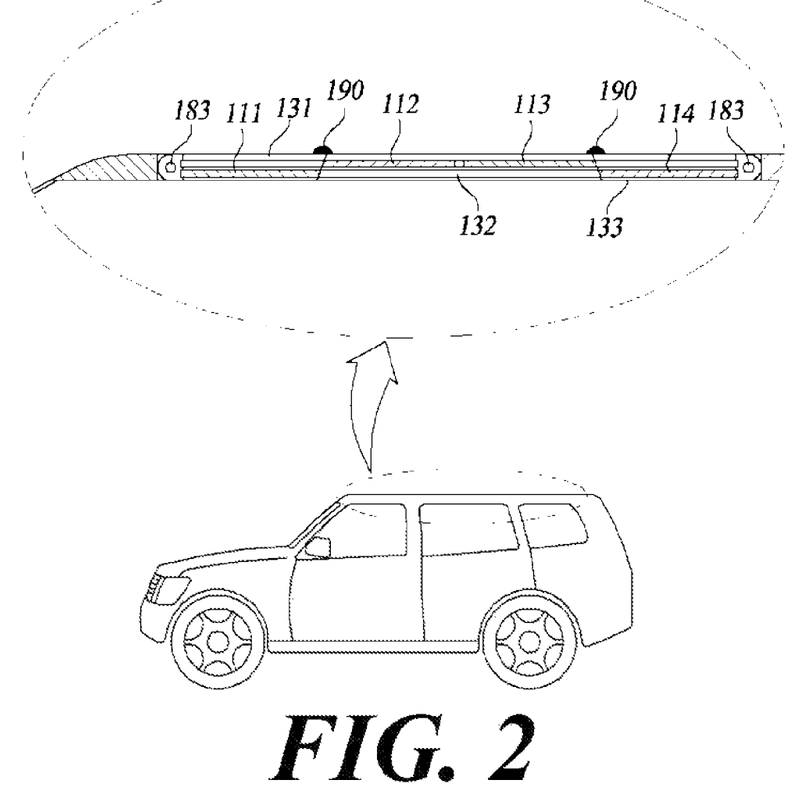
FIG. 2 is a side cross-sectional view illustrating a roof device for a vehicle according to an embodiment of the present disclosure.

FIG. 2 is a side cross-sectional view illustrating a roof device according to an embodiment of the present disclosure.

Referring to FIG. 2, in a closed state of the roof device 100, the plurality of plate members 111 to 114 may be disposed to be spaced apart from each other in a height direction of the vehicle (hereinafter, 'height direction'). The roof of the vehicle may be opened by sliding the plurality of plate members 111 to 114 spaced apart from each other in the height direction to overlap each other. The first plate member 111 and the second plate member 112 may be arranged to be spaced apart from each other in the height direction, and the third plate member 113 and the fourth plate member 114 may be arranged to be spaced apart from each other in the height direction. The first and fourth plate members 111 and 114 may be disposed at the same height as each other, and the second and third plate members 112 and 113 may be disposed at the same height as each other. The second and third plate members 112 and 113 may be disposed higher than the first and fourth plate members 111 and 114. The second plate member 112 may be moved to be superimposed on an upper side of the first plate member 111, or the third plate member 113 may be moved to be superimposed on an upper side of the fourth plate member 114 to open a portion of the roof device 100.

Figure 3:
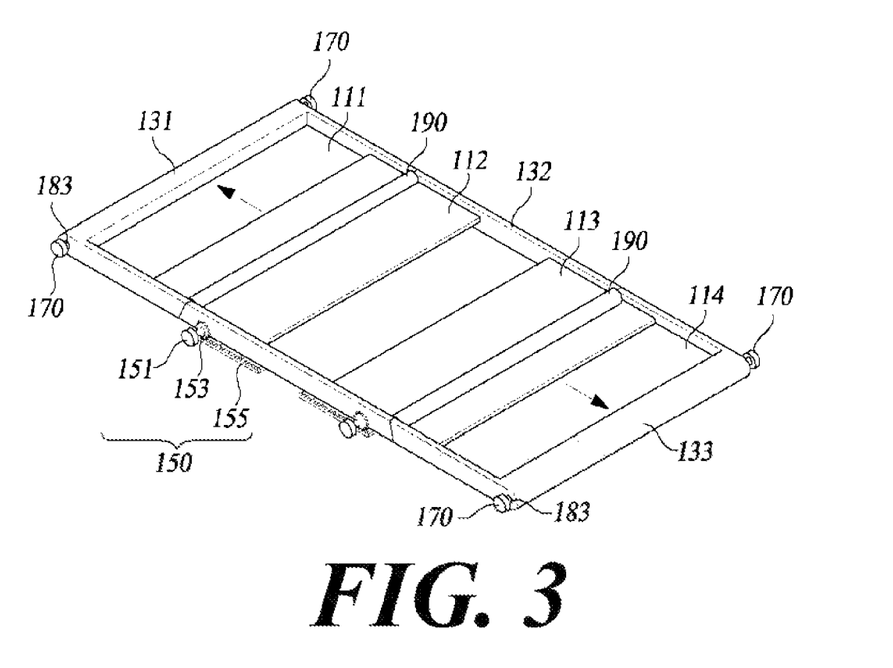
FIG. 3 is a perspective view illustrating a driving state of a power transmission mechanism according to an embodiment of the present disclosure.

FIG. 3 is a perspective view illustrating a driving state of a power transmission mechanism according to an embodiment of the present disclosure.

Figure 4:
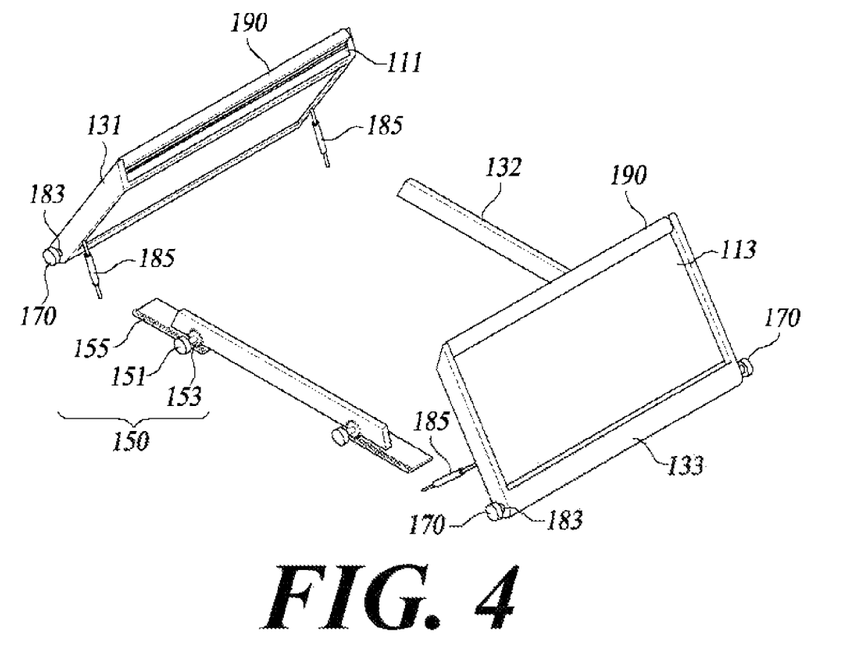
FIG. 4 is a perspective view illustrating a driving state of a second motor according to an embodiment of the present disclosure.

FIG. 4 is a perspective view illustrating a driving state of a second motor according to an embodiment of the present disclosure.

Figure 5:
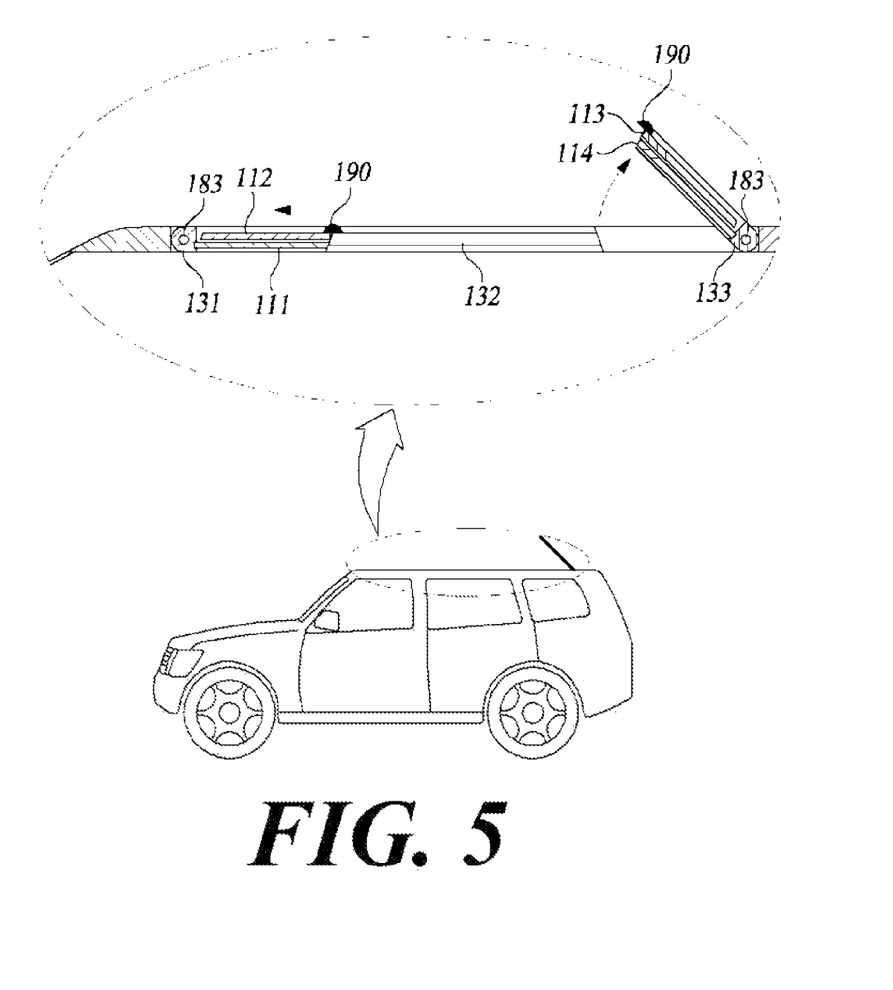
FIG. 5 is a side cross-sectional view illustrating a driving state of a roof device for a vehicle according to an embodiment of the present disclosure.

FIG. 5 is a side cross-sectional view illustrating a driving state of a roof device according to an embodiment of the present disclosure.

Referring to FIGS. 1 to 5, the frame 130 is coupled to a vehicle body to support the plurality of plate members 111 to 114. The frame 130 is configured such that at least one of the plate members 111 to 114 may slide along an inner edge of the frame 130. In order for the frame 130 to support the plate members 111 to 114, an accommodation groove corresponding to an edge shape of the plate members 111 to 114 may be formed along the inner edge of the frame 130. The accommodation groove is formed so that the plate members 111 to 114 are guided on the accommodation groove to slide in the longitudinal direction. In order to support the plurality of plate members 111 to 114 spaced apart from each other in the height direction, two accommodation grooves spaced apart from each other in the height direction may be formed on the inner edge of the frame 130.

The frame 130 may include a plurality of supporting members 131 to 133. A combination of the plurality of supporting members 131 to 133 is configured to form a perimeter of the window. The plurality of supporting members 131 to 133 may be configured to support a combination of different plate members 111 to 114 in a state in which the roof device 100 is closed. The plurality of supporting members 111 to 113 may include a first supporting member 131, a second supporting member 132, and a third supporting member 133 supporting the first plate member 111, the second plate member 112, the third plate member 113, and the fourth plate member 114 in a state in which the roof device 100 is closed. The first supporting member 131 is disposed on one side of the second supporting member 132, and the third supporting member 133 is disposed on an opposite side of the second supporting member 132. Accommodation grooves for receiving edges of the plate members 111 to 114 are formed along an inner edge of the first to third supporting members 131 to 133. The first supporting member 131 and the third supporting member 133 may have two accommodating grooves spaced apart from each other in the height direction on an inner side thereof to support two plate members. The second plate member 112 supported by the second supporting member 132 may slide toward the first supporting member 131 and may be supported by the first supporting member 131 together with the first plate member 111. The third plate member 113 supported by the second supporting member 132 may slide toward the third supporting member 133 and may be supported by the third supporting member 133 together with the fourth plate member 114. When the second or third plate member 112 or 113 overlaps the first or fourth plate member 111 or 114, respectively, the vehicle roof is opened.

Referring to FIG. 3, the roof device 100 according to an embodiment of the present disclosure is configured to slide at least one of a plurality of plate members with respect to the frame 130 using power of a first motor 151. The power transmission mechanism 150 may configured to transmit power of the first motor 151 to at least one of the plurality of plate members 111 to 114 to let the plate member 111 to 114 slide along the inner edge of the frame 130. The power transmission mechanism 150 may include a driving gear 153 connected to the first motor 151 and a rail gear 155 coupled to at least one of the plurality of plate members. The driving gear 153 is configured to rotate using rotational power of the first motor 151. The rail gear 155 is coupled to at least one of the plurality of plate members and is engaged with the driving gear 153. When the driving gear 153 rotates together with the first motor 151, the rail gear 155 engaged with the driving gear 153 moves. Accordingly, the plate member on which the rail gear 155 is mounted may slidably move on the frame 130. The rail gear 155 may be mounted on the edge of each of the second and third plate members 112 and 113. Although the rail gear 155 is illustrated as being mounted on the left side of the vehicle in FIG. 3, the roof device 100 of the present disclosure is not limited thereto. For example, the rail gear 155 may be mounted on the left side of the second plate member 112, and the rail gear 155 may be mounted on the right side of the third plate member 113. The power transmission mechanism 150 of the present disclosure is not limited to such a configuration. The power transmission mechanism 150 may have, for example, a piston operated by hydraulic pressure.

Referring to FIG. 4, at least a portion of the frame 130 is configured to rotate around its edge. The first supporting member 131 and the third supporting member 133 may be configured to rotate around its edge in a width direction of the vehicle body. The roof device 100 may include a second motor 170 for rotating at least a portion of the frame 130 around its edge. At least a portion of the frame 130 may be coupled to the vehicle body using a hinge, and the hinge may be coupled to a shaft of the second motor 170. The vehicle front frame 130 of the first supporting member 131 and the vehicle rear frame 130 of the third supporting member 133 may be coupled to the vehicle body using a hinge. A damper 185 having both ends connected to the vehicle body and the first supporting member 131 or the third supporting member 133 may be mounted. The damper 185 may prevent a safety accident, such as a hand being caught due to abrupt closing of the first supporting member 131 or the third supporting member 133. The first supporting member 131 may rotate around its edge on the opposite side of the second supporting member 132. The third supporting member 133 may rotate around its edge on the opposite side of the second supporting member 132. The first supporting member 131 according to an embodiment of the present disclosure may rotate in association with rotation of the second motor 170. The third supporting member 133 may also rotate in association with rotation of the second motor 170. Respective end portions of the supporting members may be inclined such that an end portion of the first supporting member 131 adjacent to the second supporting member 132 is located above an end portion of the second supporting member 132 adjacent to the first supporting member 131. This is to prevent a free end of the first supporting member 131 from being caught by the second supporting member 132 and rotating. Similarly, respective end portions of the supporting members may be inclined such that an end portion of the third supporting member 133 adjacent to the second supporting member 132 is located above an end portion of the second supporting member 132 adjacent to the third supporting member 133.

Referring to FIG. 5, the second plate member 112 slides toward the first supporting member 131 and is disposed above the first supporting member 131. As a result, a portion of an area covered by the second supporting member 132 is opened. As the driving gear 153 connected to the second plate member 112 rotates counterclockwise, the second plate member 112 may be moved toward the first supporting member 131. The third plate member 113 is disposed above the first plate member 111. In a state in which the vehicle roof is closed, the third plate member 113 may slide upwardly of the first plate member 111 to be disposed above the fourth plate member 114. As the driving gear 153 connected to the third plate member 113 rotates clockwise, the third plate member 113 may be moved toward the third supporting member 133. The hinge disposed at the rear of the third supporting member 133 rotates clockwise. When the second motor 170 rotates clockwise, the hinge coupled to a shaft of the second motor 170 may rotate clockwise. Accordingly, the third supporting member 133 rotates upwardly of the vehicle body together with the third and fourth plate members 113 and 114.

Referring to FIGS. 1 to 5, the frame 130 may be equipped with a sealing member for sealing the interior of the vehicle. The sealing member may be disposed to seal portions between the respective plate members when the roof device 100 is closed. The sealing member may not be mounted on the second supporting member 132. Accordingly, rotation of the first and third supporting members 131 and 133 is facilitated, and when the roof device 100 is opened, the sealing member does not cross the middle of the window. The sealing member may be coupled to each of a free end of the first supporting member 131 and a free end of the third supporting member 133.

Figure 6:
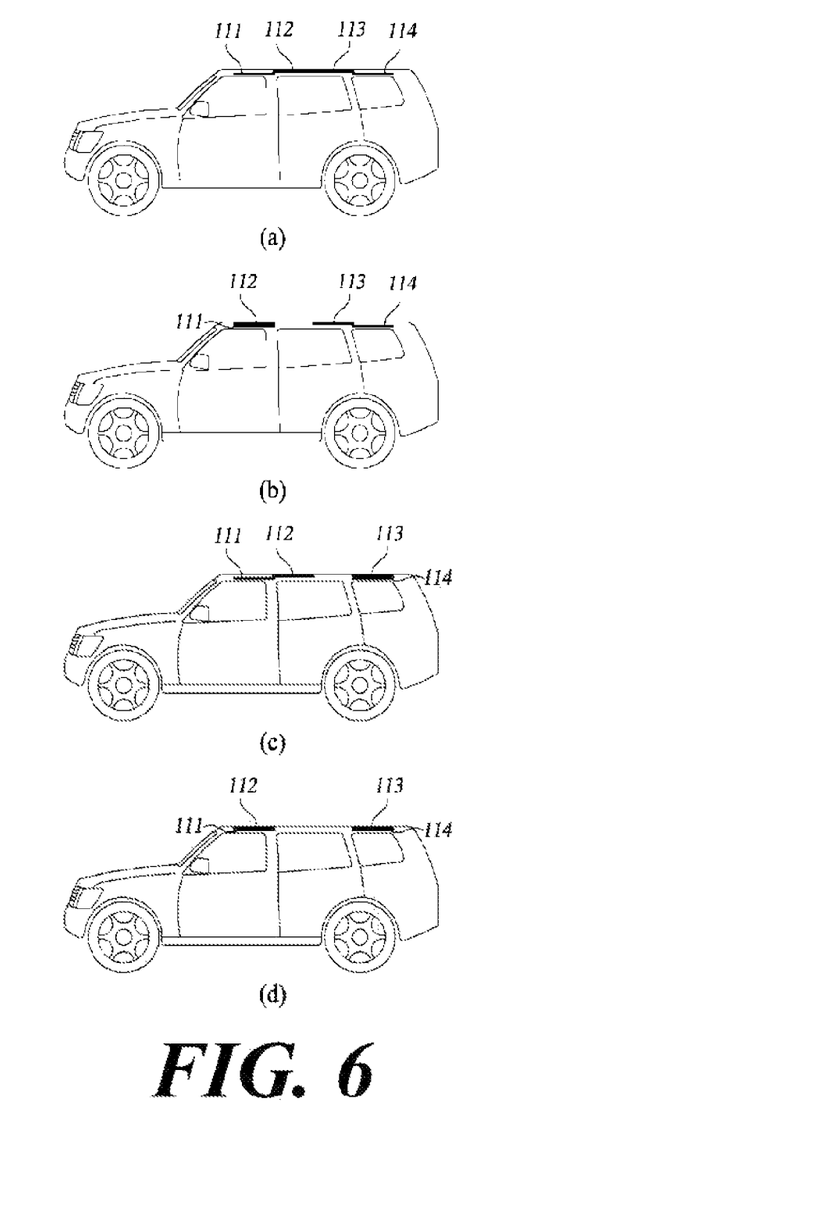
FIG. 6 (includes FIGS. A-D) is a perspective view illustrating a state in which a roof device for a vehicle is opened by moving a plate member according to an embodiment of the present disclosure.

FIG. 6 is a perspective view illustrating a state in which the roof device 100 is opened by moving a plate member according to an embodiment of the present disclosure.

Figure 7:
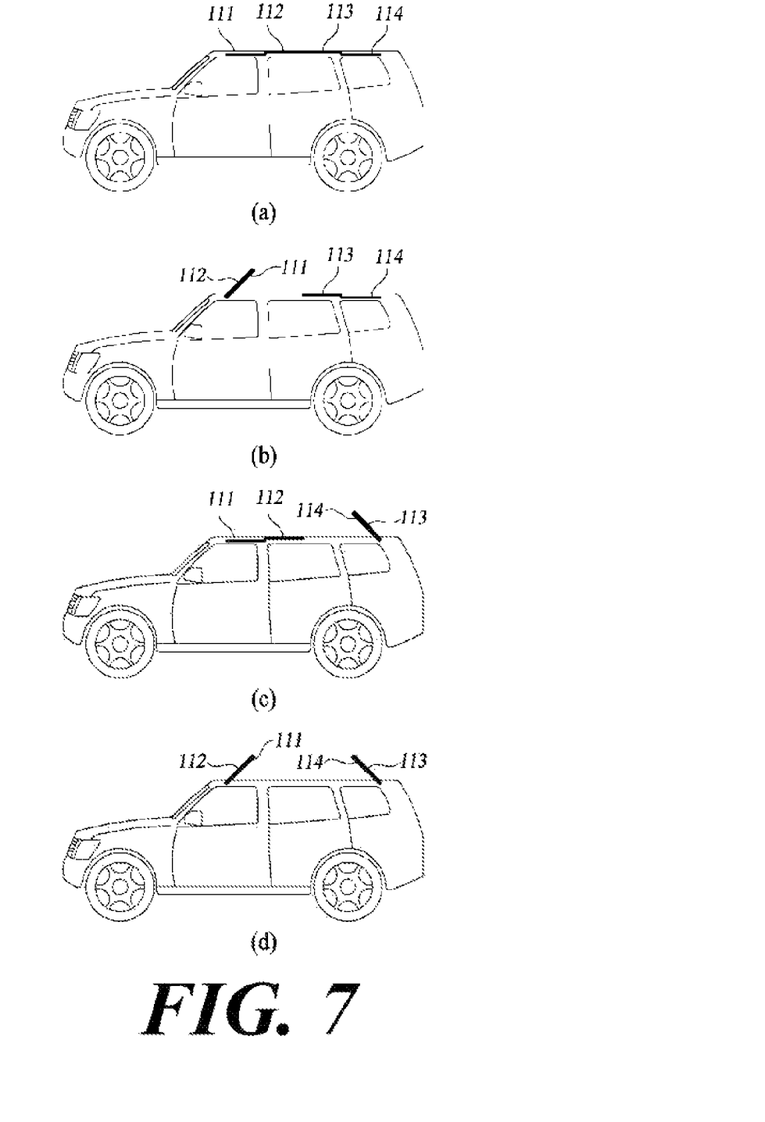
FIG. 7 (includes FIGS. 7A-D) is a perspective view illustrating a state in which a roof device for a vehicle is opened by rotating a supporting member according to an embodiment of the present disclosure.

FIG. 7 is a perspective view illustrating a state in which the roof device 100 is opened by rotating a supporting member according to an embodiment of the present disclosure.

The vehicle roof may be opened and closed by pushing the plate member, and the roof may be opened and closed by rotating the supporting member. An open shape of the roof device 100 may be different by changing a rotation angle of the supporting members 131 to 133 or by changing positions of the plate members 111 to 114. An open shape of the roof device 100 may be selected by a vehicle occupant or an autonomous driving safety system of the vehicle.

FIGS. 6 and 7(a) show a state in which the roof device 100 is closed. In FIG. 7(a), the first to fourth plate members 111 to 114 are sequentially disposed from the front to the rear of the vehicle. FIG. 6(b) shows a state in which the second plate member 112 is supported by the first supporting member 131. The second plate member 112 is positioned above the first plate member 111 so that a portion of the roof is opened. FIG. 6(c) shows a state in which the third plate member 113 is supported by the third supporting member 133. The third plate member 113 is positioned above the fourth plate member 114 so that a portion of the roof is opened. FIG. 6(d) shows that the first supporting member 131 supports the first and second plate members 111 and 112, and the third supporting member 133 supports the third and fourth plate members 113 and 114. In this case, the roof device 100 is opened by an area corresponding to an area of the second plate member 112 and the third plate member 113.

FIG. 7(a) illustrates a state in which the first supporting member 131 rotates upwardly of the vehicle while supporting the first and second plate members 111 and 112. FIG. 7(c) shows a state in which the roof device 100 is maximally opened. The roof device 100 is maximally opened when the first supporting member 131 supports the first and second plate members 111 and 112, the third supporting member 133 supports the third and fourth plate members 113 and 114, and the supporting members 131 and 133 are rotated upwardly of the vehicle to the maximum. The first supporting member 131 may be configured to be disposed parallel to a windshield of the vehicle in a state of being maximally rotated.

Figure 8:
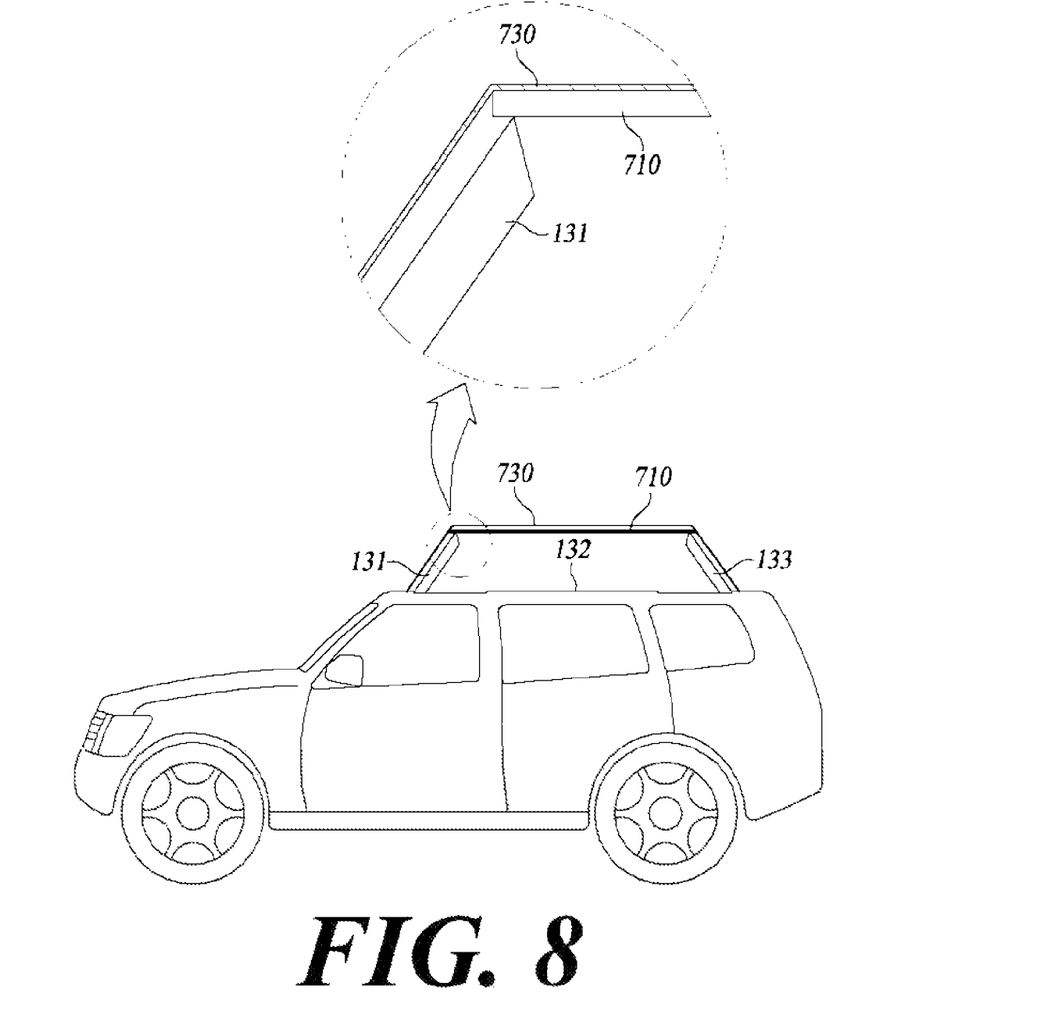
FIG. 8 is a side view illustrating a tent cover and a pole according to an embodiment of the present disclosure.

FIG. 8 is a side view illustrating a tent cover and a pole according to an embodiment of the present disclosure.

Referring to FIG. 8, the roof device 100 may include a pole 710 having both ends respectively mounted on the first supporting member 131 and the third supporting member 133 and a tent cover (tent cover, 730) supported by the first supporting member 131, the pole 710, and the third supporting member 133 in a state in which the vehicle roof is completely opened.

One of the technical effects of the roof device 100 according to an embodiment of the present disclosure is that the indoor space of the vehicle may be further expanded using the sliding method and the hinged method, compared with a case in which only the sliding method or only the hinged method is used. In this way, the roof device 100 may be opened in various forms according to the preference of the occupant. In addition, the occupant may open the roof of the vehicle simply by inputting a driving signal to the input device by the power transmission mechanism 150 and the second motor 170. The roof device 100 may be controlled by a control method of the roof device 100 to be described below.

Figure 9:
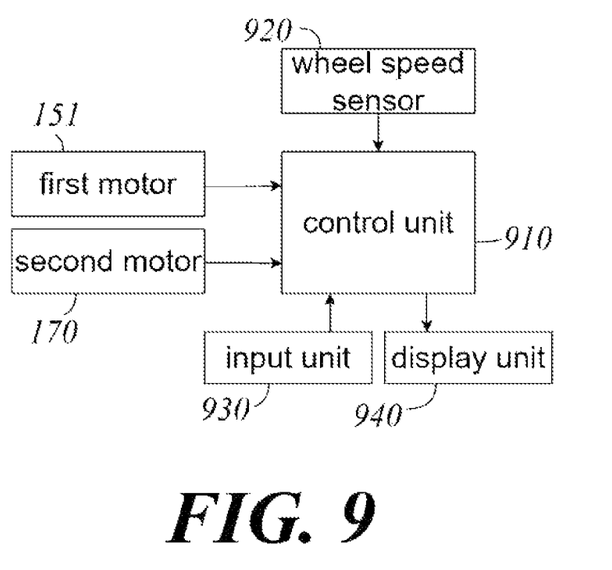
FIG. 9 is a block diagram schematically illustrating a configuration of a roof device for a vehicle according to an embodiment of the present disclosure.

FIG. 9 is a block diagram schematically illustrating a configuration of a roof device according to an embodiment of the present disclosure.

Figure 10:
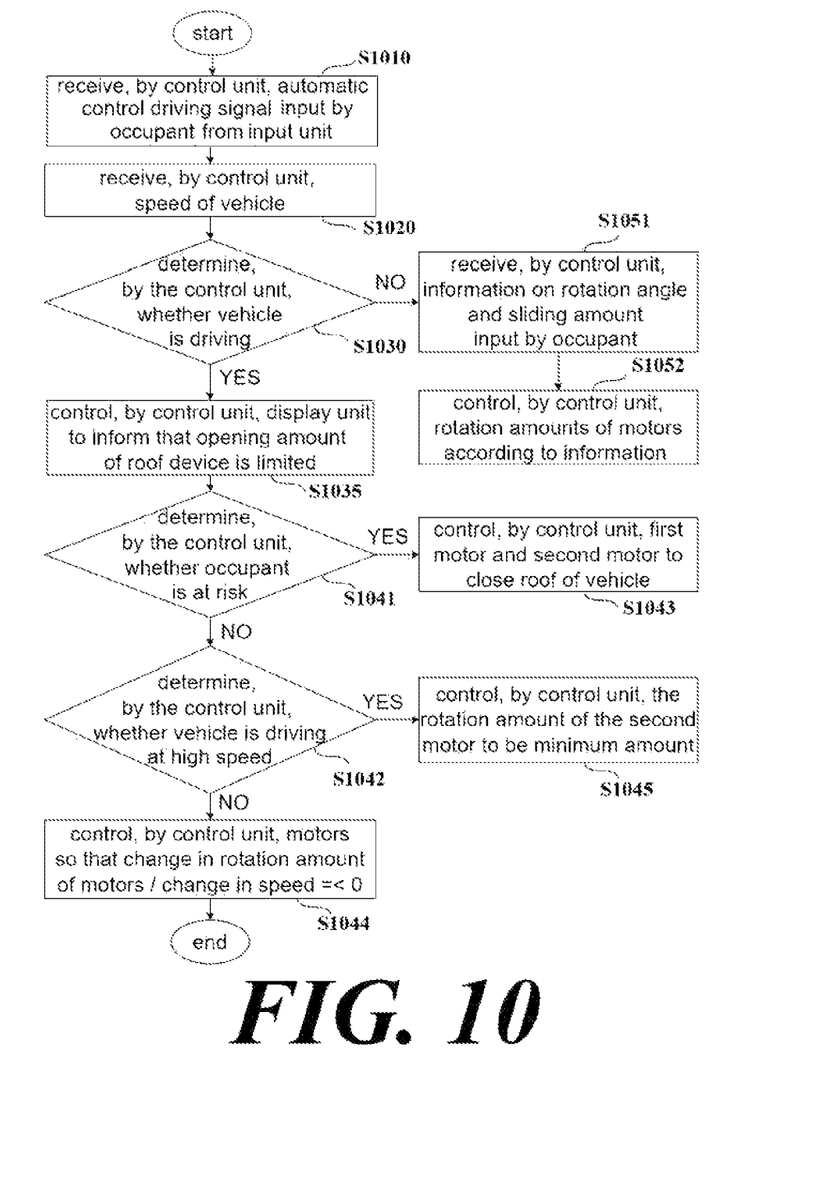
FIG. 10 is a flowchart illustrating a control method according to an embodiment of the present disclosure.

FIG. 10 is a flowchart illustrating a control method according to an embodiment of the present disclosure.

Referring to FIGS. 1 to 10, the first motor 151 supplies power to the power transmission mechanism 150. The power transmission mechanism 150 is configured to move at least one of the plurality of plate members from any one of the plurality of supporting members to the other of the supporting members. The second motor 170 is configured to let at least one of the supporting members rotate around its edge. In the present disclosure, a rotation amount of each motor when the roof device 100 is closed may be set to zero. The power transmission mechanism 150 may be configured to increase the degree of opening of the roof as the rotation amount of the first motor 151 increases. A control unit 910 may control the rotation amount of the first motor 151 and the second motor 170 to adjust an opening state of the roof device 100, that is, the degree of opening or the form of opening.

The vehicle occupant may input an automatic control driving signal of the roof device 100 to an input unit 930. The driving signal may be, for example, an electrical signal generated as the occupant touches a display unit 940 disposed on the front of the driver's seat. The vehicle occupant may execute an automatic control process by inputting a driving signal. In contrast, when the vehicle occupant does not want automatic control, the vehicle occupant may input a driving stop signal or may not input a driving signal to stop the automatic control process. In step S1010, the control unit 910 receives an automatic control driving signal input by the vehicle occupant from the input unit 930. In step S1020, the control unit 910 receives a vehicle speed value from a wheel speed sensor 920. In step S1030, the control unit 910 determines whether the vehicle is driving based on the received speed value.

When it is determined that the vehicle is driving, the control unit 910 may perform a process (S1035) of controlling the display unit 940 of the vehicle to inform the occupant that the opening amount of the roof device 100 is limited. The display unit 940 may be a portion of audio, video, navigation (AVN) of the vehicle. The control unit 910 controls a rotation amount of the first motor 151 so that the change in the amount of rotation of the first motor 151 with respect to the change in a speed of the vehicle has a value less than or equal to 0. In addition, the control unit 910 controls the rotation amount of the second motor 170 so that the change in the amount of rotation of the second motor 170 with respect to the change in the speed of the vehicle has a value less than or equal to 0 (S1041 to S1044). According to such a control method, as the speed of the vehicle increases, the amount of opening of the roof may be reduced. Here, the amount of opening is a value that changes depending on a rotation angle of the supporting member and a position of the plate member and may be understood to have a greater value as the rotation angle of the supporting member increases and as an area in which the plurality of plate members overlap each other increases.

When it is determined that the vehicle is not driving, the occupant may adjust the rotation angle of the supporting member or a sliding distance of the plate member according to his/her preference using the control method of the present disclosure. Here, the sliding distance refers to a distance from the position of each plate member in a state in which the roof device is closed. The occupant inputs information on the rotation angle of the supporting member and information on the sliding distance of the plate member to the input unit 930. When an animation representing the roof device 100 is displayed on the display unit 940 of the vehicle, the occupant may input information on the rotation angle of the supporting member or the sliding distance of the plate member by moving the displayed supporting member or the plate member by touching a screen. Information on the rotation angle or the like may be input. In step S1051, the control unit 910 receives the information on the rotation angle of the supporting member and the sliding distance of the plate member input by the occupant from the input unit 930. In step S1052, the control unit 910 controls the amount of rotation of the first motor 151 and the second motor 170 according to the information on the rotation angle of the supporting member and the information on the sliding distance of the plate member. Here, the rotation amount of the first motor 151 and the second motor 170 may be a rotation amount that allows the roof device 100 to be opened as intended by the occupant.

When it is determined that the vehicle is driving, the control unit 910 may determine whether the occupant of the vehicle is at risk based on the speed of the vehicle (S1041). Whether the occupant of the vehicle is at risk may be determined by a safety logic of the autonomous driving system of the vehicle. Whether or not the occupant is at risk may be determined using a slope of a road, a pavement condition of the road, a speed of the vehicle, a distance to a nearby vehicle, the weather, and the like. For example, when the speed of the vehicle is greater than or equal to a preset speed and the slope of the road is downhill in a traveling direction of the vehicle, the control unit 910 may determine that the occupant of the vehicle is at risk. When it is determined that the occupant is at risk in step S1041, the control unit 910 controls the first motor 151 and the second motor 170 to close the roof of the vehicle (S1043). In contrast, when it is determined that the occupant is not at risk, the control unit 910 determines whether the vehicle is driving at a high speed based on a speed value of the vehicle (S1042).

When it is determined that the vehicle is not driving at a high speed, the control unit 910 controls the rotation amount of the first motor 151 so that the change in the amount of rotation of the first motor 151 with respect to the a change in a speed of the vehicle has a value less than or equal to 0. In addition, the control unit 910 controls the rotation amount of the second motor 170 so that the change in the amount of rotation of the second motor 170 with respect to the change in the speed of the vehicle has a value less than or equal to 0 (S1044). Air resistance increases as the speed of the vehicle is higher and as the area of the vehicle of a component perpendicular to a driving direction of the vehicle increases. As the air resistance increases, fuel efficiency of the vehicle decreases. Accordingly, according to the control method of an embodiment of the present disclosure, the area of the vehicle of the component perpendicular to the driving direction of the vehicle decreases as the speed of the vehicle increases, thereby preventing an excessive reduction of fuel efficiency of the vehicle.

When it is determined that the vehicle is driving at a high speed, the control unit 910 controls the second motor 170 so that the rotation amount of the second motor 170 is a minimum rotation amount. That is, when it is determined that the vehicle is driving at a high speed, the control unit 910 prevents the supporting member from rotating upwardly of the vehicle. According to the control method of the roof device 100, the opening amount of the roof is limited in a high-speed driving situation, so that the vehicle may safely transport an occupant.

What is claimed is:
1. A roof device for a vehicle, the roof device comprising:
   a plurality of plate members; and
   a frame coupled to a vehicle body and configured to support the plurality of plate members,
   wherein at least a portion of the frame is configured to rotate around its edge, and at least one of the plurality of plate members is configured to slide along an inner edge of the frame.
2. The roof device of claim 1, wherein the frame includes a plurality of supporting members, and
   wherein each of the supporting members is configured to support a different group of the plate members in a state in which the roof device is closed, and at least one of the plurality of supporting members is configured to rotate around its edge.
3. The roof device of claim 2, wherein:
   the plurality of plate members include a first plate member, a second plate member, a third plate member, and a fourth plate member, and
   the plurality of supporting members include a first supporting member configured to support the first plate member, a second supporting member configured to support the second plate member and the third plate member, and a third supporting member configured to support the fourth plate member, in a state in which the roof device is closed.
4. The roof device of claim 3, wherein the first supporting member is disposed on one side of the second supporting member and the third supporting member is disposed on an opposite side of the second supporting member, in a state in which the roof device is closed.

5. The roof device of claim 4, wherein:
the first plate member and the second plate member are disposed to be spaced apart from each other in a height direction of the vehicle body, and
the third plate member and the fourth plate member are disposed to be spaced apart from each other in the height direction of the vehicle body.

6. The roof device of claim 1, further comprising:
a power transmission mechanism configured to transmit power of a first motor to at least one of the plurality of plate members such that the at least one plate member slides along the inner edge of the frame.

7. The roof device of claim 6, wherein the power transmission mechanism includes a driving gear configured to be rotated by the first motor and a rail gear coupled to the at least one of the plurality of plate members and engaged with the driving gear.

8. The roof device of claim 1, further comprising:
a second motor configured to let at least a portion of the frame rotate on its edge.

9. The roof device of claim 4, wherein:
the first supporting member is configured to rotate on its edge in a width direction of the vehicle body, and
the third supporting member is configured to rotate on its edge parallel in a width direction of the vehicle body.

10. The roof device of claim 9, wherein each of the first supporting member and the third supporting member is configured to rotate around its edge on the opposite side of the second supporting member.

11. The roof device of claim 1, further comprising:
at least one sealing member mounted on the frame.

12. A control method of a roof device for a vehicle including a control unit for controlling a first motor configured to supply power to a power transmission mechanism such that at least one of a plurality of plate members slides on supporting members, and control a second motor configured to supply its power to at least one of the supporting members to rotate the at least one of the supporting members around its edge, the control method comprising:
receiving, by the control unit, a speed of the vehicle from a wheel speed sensor;
determining, by the control unit, whether the vehicle is driving; and
controlling, by the control unit, a rotation amount of each of the first motor and the second motor, to control an opening state of the roof device.

13. The control method of claim 12, further comprising:
receiving, by the control unit, information on a rotation angle of a supporting member input by an occupant of the vehicle and information on a sliding distance of the at least one of the plurality of plate members from an input unit of the vehicle, when it is determined that the vehicle is not driving; and
controlling, by the control unit, the rotation amount of each of the first motor and the second motor according to the information on the rotation angle of the at least one of the plurality of supporting members and the sliding distance of the at least one of the plurality of plate members.

14. The control method of claim 12, wherein controlling the rotation amount of each of the first motor and the second motor includes:
determining, by the control unit, whether the occupant of the vehicle is at risk based on a speed value of the vehicle; and
controlling, by the control unit, the first motor and the second motor to close the roof of the vehicle, when it is determined that the occupant is at risk.

15. The control method of claim 14, wherein controlling the rotation amount of each of the first motor and the second motor includes:
determining whether the vehicle is driving at a high speed based on the speed value of the vehicle when it is determined that the occupant is not at risk;
controlling, by the control unit, the rotation amount of each of the first motor and the second motor so that the change in the rotation amount of the first motor with respect to the change in the speed of the vehicle, and the change in the rotation amount of the second motor with respect to the change in the speed of the vehicle have a value less than or equal to 0, when it is determined that the vehicle is not driving at a high speed; and
controlling, by the control unit, the second motor so that the rotation amount of the second motor is a minimum rotation amount, when it is determined that the vehicle is driving at a high speed.

16. The control method of claim 12, further comprising:
controlling, by the control unit, a display unit of the vehicle to inform the occupant that an opening amount of the roof device is limited, when it is determined that the vehicle is driving.

17. The control method of claim 12, further comprising:
receiving, by the control unit, an automatic control driving signal of the roof device input by an occupant of the vehicle from an input unit,
wherein the control method of the roof device is performed, after receiving the driving signal.

* * * * *